United States Patent
Woleben et al.

(10) Patent No.: US 7,684,808 B1
(45) Date of Patent: Mar. 23, 2010

(54) LIMITING CHANNEL ELEMENT USAGE BASED ON COMMUNICATION TYPE

(75) Inventors: Samuel M. Woleben, Olathe, KS (US); Scott B. Wilson, Shawnee, KS (US); Bryan T. Barbee, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 905 days.

(21) Appl. No.: 11/370,692

(22) Filed: Mar. 8, 2006

(51) Int. Cl.
*H04W 72/00* (2009.01)

(52) U.S. Cl. .............. 455/450; 455/451; 455/456.1; 455/422.1; 370/328; 370/329; 370/338

(58) Field of Classification Search ............ 455/422.1, 455/450, 451, 452.1, 455, 464, 509, 510; 370/329, 331, 328, 338
See application file for complete search history.

(56) References Cited

U.S. PATENT DOCUMENTS

| 5,504,939 | A | | 4/1996 | Mayrand et al. |
| 5,802,471 | A | * | 9/1998 | Sawai et al. ............... 455/445 |
| 6,148,204 | A | * | 11/2000 | Urs et al. ................... 455/433 |
| 6,553,060 | B2 | * | 4/2003 | Souissi et al. ............. 375/219 |
| 7,107,037 | B1 | * | 9/2006 | Talley et al. ................ 455/400 |
| 2002/0061753 | A1 | | 5/2002 | Lysejko et al. |
| 2002/0106005 | A1 | * | 8/2002 | Motiwala et al. ........... 375/142 |
| 2003/0050071 | A1 | | 3/2003 | Shurvinton |
| 2003/0117953 | A1 | | 6/2003 | Kinahan et al. |
| 2004/0062221 | A1 | * | 4/2004 | Gopalakrishnan et al. ... 370/335 |
| 2004/0252679 | A1 | * | 12/2004 | Williams et al. ............ 370/356 |
| 2005/0122999 | A1 | * | 6/2005 | Scherzer et al. ............ 370/480 |
| 2005/0220117 | A1 | * | 10/2005 | Omi et al. ................. 370/395.4 |

* cited by examiner

Primary Examiner—Jean A Gelin

(57) ABSTRACT

A method and apparatus for assigning channel elements in a radio access network (RAN) based on the type of the communication requiring a channel element. When the RAN receives a request to set up a communication of a particular type with an endpoint in a given wireless coverage area, the RAN responsively determines a proportion of the channel elements that are presently assigned to communications of the particular type. If the proportion does not exceed a predetermined threshold for communications of the particular type, the RAN may assign a channel element to the communication by transmitting the necessary signaling messages to the endpoint, one of which may include an identifier of the assigned channel element. The RAN may then determine and store an indication of the type of the communication being assigned the channel element by correlating signaling messages.

20 Claims, 4 Drawing Sheets

LIMITING CHANNEL ELEMENT USAGE BASED ON COMMUNICATION TYPE

FIELD OF THE INVENTION

The present invention relates to wireless communications and more particularly to the assignment of channel elements in a wireless communication network based on the type of the communication requiring the channel element.

DESCRIPTION OF RELATED ART

The art and popularity of wireless communications has grown significantly over recent years. Indeed, millions of people are engaging in voice and data communications using mobile stations such as cellular telephones and Personal Digital Assistants (PDAs). In principle, a user can communicate over the Internet or call anyone over the Public Switched Telephone Network (PSTN) from any place inside the coverage area of a wireless communication network.

In a typical wireless communication network, an area is divided geographically into a number of cells and cell sectors, each defined by a radio frequency (RF) radiation pattern from a respective base transceiver station (BTS). The BTSs in the cells in turn couple to a base station controller (BSC), which then couples to a telecommunications switch or gateway, such as a mobile switching center (MSC) or packet data serving node (PDSN) for instance. The switch or gateway may then couple to a transport network, such as a public switched telephone network (PSTN) or a packet-switched network (e.g., the Internet). Conveniently with this arrangement, when a mobile station is positioned within a given sector, the mobile station can communicate with entities on the transport network via a communication path comprising the BTS, the BSC, the switch or gateway, and the transport network. The combination of network entities that provides a connection between the mobile station and the transport network may be considered a radio access network (RAN).

The BTS discussed above includes an antenna tower and associated radio-equipment. The radio-equipment includes a plurality of "channel elements," each of which functions to define a respective air interface channel for wireless communication with a mobile station. In operation, the BTS dynamically assigns its available channel elements on an as-needed basis. In particular, when setting up an air interface traffic channel (e.g., a radio link) with a mobile station (for an incoming or outgoing communication), the BTS will select and assign one of its channel elements for use to define that channel. That channel element will then typically remain reserved for the duration of the associated communication.

Traditionally, a BTS would need to assign air interface traffic channels merely to support incoming or outgoing telephone calls. With advances in wireless communication technology, however, many more types of calls now require use of air interface traffic channels, and thus channel elements. (As used in this specification, the term "call" may be used interchangeably with the term "communication," and refers to any type of communication, including phone calls, any data sessions, short message service (SMS), etc.) This increased demand can place a strain on a BTS's limited supply of channel elements.

One area of growing concern in this regard is location based services, and particularly an increasing desire to track the geographical location of mobile stations. Such a feature was initially developed to assist emergency services in locating a mobile station, but the availability of location information to support E911 services has given rise to the development of many other location-based services as well. For example, a location-based service provider (e.g., a wireless cellular carrier or third party) may provide a requesting party with the current location of a mobile station, enabling the requesting party to track the mobile station (e.g., for courier, child, or pet tracking). As another example, given the location of a mobile station, a location-based service provider (e.g., a wireless cellular carrier or third party) can provide a requesting party with other information related to the location of the mobile station, such as a weather or traffic report, a list of services or establishments (e.g., restaurants, parks, theatres, etc.), or a map of the mobile station's location. Other location-based services exist currently or will be developed in the future as well.

In practice, when a location-based service (LBS) application wants to determine the location of a mobile station, the LBS application may send a location request message to a wireless communication network that serves the mobile station. In turn, the wireless communication network may engage in a communication session with the mobile station, through which the mobile station may report location related information (e.g., global positioning system (GPS) or advanced forward link trilateration (AFLT) related information) to the network. To track the location of a mobile station over time, this process may thus be repeated periodically, each time potentially tying up a respective channel element. It follows that, as more and more users subscribe to LBS applications (e.g., tracking services), they may use up the channel elements solely for this type of communication, leaving none for use to support legacy calls and other communication types, such as data sessions and Short Message Service (SMS). Accordingly, a wireless communication network that limits the amount of channel elements it assigns to particular communication types is desirable.

SUMMARY

The present invention advances over the existing art by providing an improved method and apparatus for assigning channel elements in a radio access network based on the type of communication requiring a channel element.

One exemplary embodiment of the present invention may take the form of a method for assigning channel elements in a radio access network (RAN) serving one or more endpoints in one or more given wireless coverage areas. According to the method, the RAN may first receive a request to set up a communication of a particular type with an endpoint in a given wireless coverage area, wherein the request includes an indication of the particular type. After receiving the request, the RAN may determine a proportion of the channel elements for the given wireless coverage area that are presently assigned to communications of the type indicated in the request. In addition, the RAN may generate and transmit a first signaling message to the endpoint that indicates the request to set up the communication with the endpoint (including the type indicated in the request), and the RAN may also receive a second signaling message from the endpoint that indicates the availability of the endpoint.

After the RAN determines the proportion of the channel elements for the given wireless coverage area that are presently assigned to communications of the type indicated in the request, the RAN may assign one of the channel elements for the given wireless coverage area to the communication if the proportion does not exceed a predetermined threshold for communications of the type indicated in the request. The function of assigning the channel element may primarily include generating and transmitting a third signaling message to the endpoint indicating the identity of the channel element assigned to the communication. However, if the RAN had not previously transmitted the first signaling message and received the second signaling message, the function of assigning the channel element may also include these operations.

If the RAN does assign one of the channel elements for the given wireless coverage area to the communication, the RAN may then store an indication of the type of the communication being assigned one of the channel elements for the given wireless coverage area. In order to carry out this function, the RAN may need to correlate the first signaling message, which preferably includes an indication of the type of the communication, with the third signaling message, which includes an indication of the identity of the assigned channel element but does not include an indication of the type of the communication.

Thus, the RAN (e.g., BTS) will maintain in data storage (i) the type of each communication presently assigned a channel element, and (ii) a predetermined threshold for each type of communication that represents the maximum proportion of total channel elements for a given wireless coverage area assignable to communications of each type. The RAN may then rely upon this data the next time the RAN receives a request to set up a communication of a particular type with an endpoint and needs to determine whether to assign a channel element to the communication.

Another exemplary embodiment of the present invention may take the form of a base transceiver station (BTS) comprising (i) an antenna structure for communicating with endpoints via an air-interface, (ii) a base station controller interface for communicating with a base station controller, (iii) a processor, (iv) data storage; and (v) program instructions stored in the data storage and executable by the processor. Further, the program instructions may carry out functions of the method described above, including (i) receiving a request to set up a communication of a particular type with an endpoint in a given wireless coverage area, wherein the request includes an indication of the particular type, (ii) determining a proportion of the channel elements for the given wireless coverage area that are presently assigned to communications of the type indicated in the request, (iii) assigning one of the channel elements for the given wireless coverage area to the communication if the proportion does not exceed a predetermined threshold for communications of the type indicated in the request, and (iv) storing an indication of the type of the communication being assigned one of the channel elements for the given wireless coverage area.

Advantageously, the present invention allows a network administrator or other operator of the RAN to limit the proportion of active communications of any particular type, in order to prevent communications of a particular type (e.g., location services) from monopolizing the resources of the RAN. This proportion-based limit advances over existing channel-element allocation schemes, which involve pre-allocating particular channel elements to particular types of communications. With that existing art, if a given subset of channel elements is allocated for use with respect to communications of a given type, the channel elements would not be used for another type of communication, even if a need existed to do so. However, with the benefit of the present invention, the channel elements are more freely allocable to communications of various types based on designated thresholds (whether set in advance or dynamically established). Thus, for instance, with the present invention, it is theoretically possible to have a threshold of 75% (of the channel elements) for one communication type and a threshold of 75% for another communication type as well, such that either one of the communication types could be allocated up to 75% of the channel elements at a given time, if that many channel elements from the pool were available to allocate. With the prior art, this would not be the case, since the prior art specifically pre-allocates particular channel elements to particular communication types These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION

Figure 1:
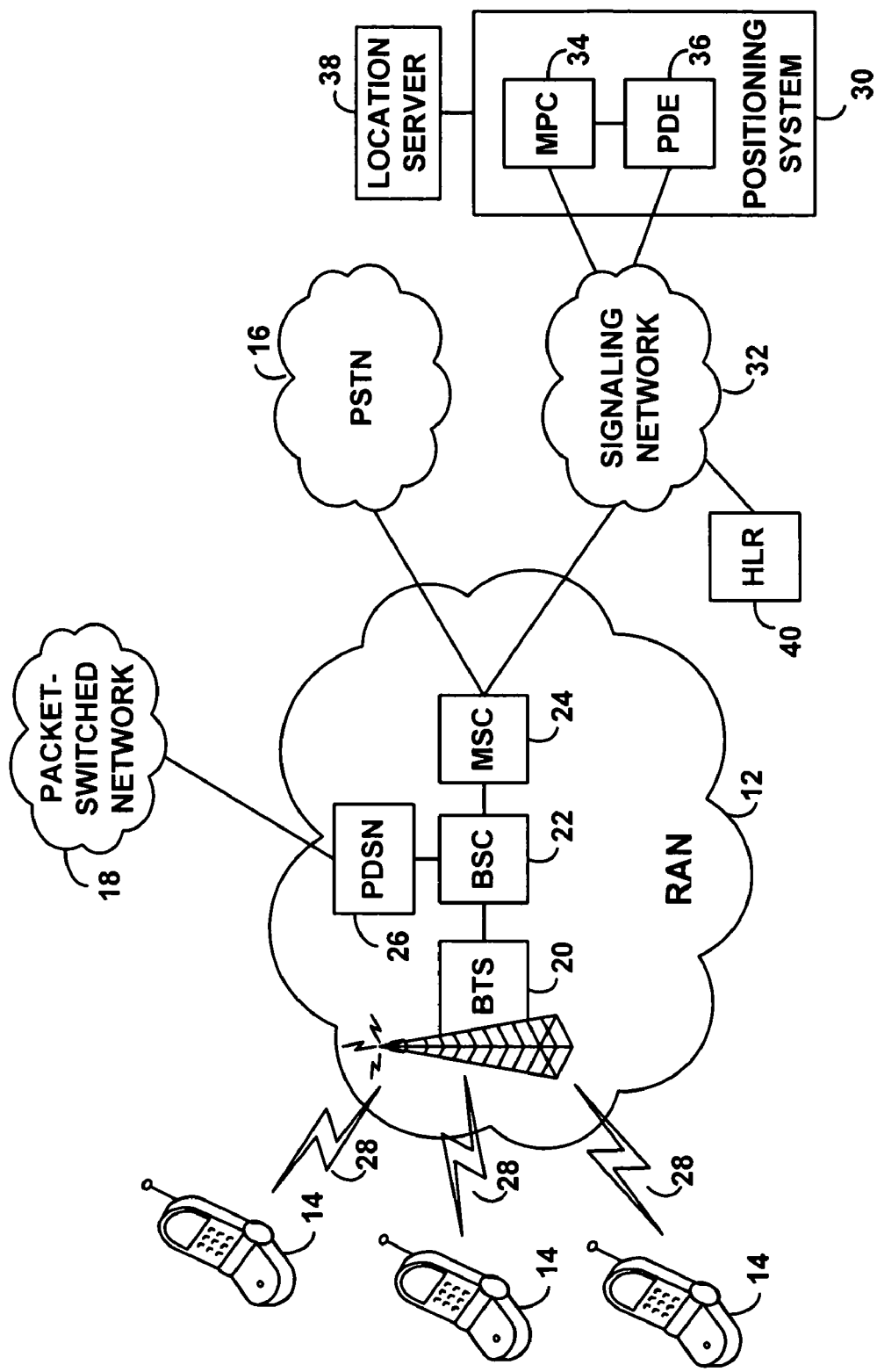
FIG. 1 is a simplified block diagram of a cellular wireless communication network arranged to carry out an exemplary embodiment of the present invention.

Referring to the drawings, FIG. 1 is a simplified block diagram of a cellular wireless communication network 10 arranged to carry out an exemplary embodiment of the present invention. As shown, the network 10 includes at its core a radio access network (RAN) 12, which may function to provide connectivity between one or more mobile stations 14 (e.g., a cell phone, PDA, or other wirelessly-equipped device), and one or more transport networks, such as a public switched telephone network (PSTN) 16 or a packet-switched network (e.g., the Internet) 18. The RAN 12 may comprise, among other entities, a base transceiver station (BTS) 20, a base station controller (BSC) 22, a mobile switching center (MSC) 24, and a packet data serving node (PDSN) 26. In addition, the network 10 may also include a positioning system 30.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory. Provided with the present disclosure, those skilled in the art can readily prepare appropriate computer instructions to perform such functions.

As shown in FIG. 1, the BTS 20 may function to transmit one or more radio frequency (RF) radiation patterns, each of which may define a given wireless coverage area such as a cell or cell sector. Within each given wireless coverage area, the BTS's RF radiation pattern provides an air interface 28 through which the mobile stations 14 may communicate with the BTS 20 of the RAN 12.

Further, for each given wireless coverage area, BTS 20 may include one or more channel element cards, each of which includes a plurality of individual channel elements. The channel elements may define a plurality of channels on the air interface 28 for carrying communications between the mobile stations 14 and the BTS 20. For example, the air interface 28 may include (i) a plurality of forward-link channels (e.g., pilot channels, sync channels, paging channels, and forward-traffic channels) for carrying communications from the BTS 20 to the mobile stations 14, and (ii) a plurality of reverse-link channels (e.g., access channels and reverse-traffic channels) for carrying communications from the mobile stations 14 to the BTS 20. As such, the BTS 20 may need to assign one of the channel elements to a communication in order to connect that communication over a channel of the air interface 28.

The channels on the air interface 28 may carry communications between the BTS 20 and mobile stations 14 according to any of a variety of protocols. For instance, the air interface communications may be analog communications compliant with the Advanced Mobile Phone Service (AMPS) protocol or may be digital communications compliant with the Code Division Multiple Access (CDMA) (e.g., EV-DO, 1xRTT, etc.), Time Division Multiple Access (TDMA), Global System for Mobile Communication (GSM) or 802.11 protocols.

The BTS 20, and its channel element cards, typically couple to the BSC 22, which may function to communicate with the BTS 20 and control aspects of the BTS 20 as well as aspects of the wireless communication over the air interface 28. In turn, the BSC 22 typically couples to the MSC 24, which may provide connectivity with the PSTN 16, and the BSC 22 also typically couples to the PDSN 18, which may provide connectivity with the packet-switched network 16. The PSTN 16 is a circuit-switched network that establishes a dedicated communication path for use during a communication session, whereas the packet-switched network 18 communicates data in the form of packets, with no previously-established communication path. The connections between the entities of the RAN 12, other than the air interface 28, may include physical cables, such as T1 trunk lines or E1 trunk lines, and/or wireless links, such as microwave links or satellite channels. Accordingly, with this general arrangement, the RAN 12 may connect communications between the mobile stations 14 and other endpoints coupled to the PSTN 16 or the packet-switched network 18 by assigning channel elements to the communications.

Figure 2:
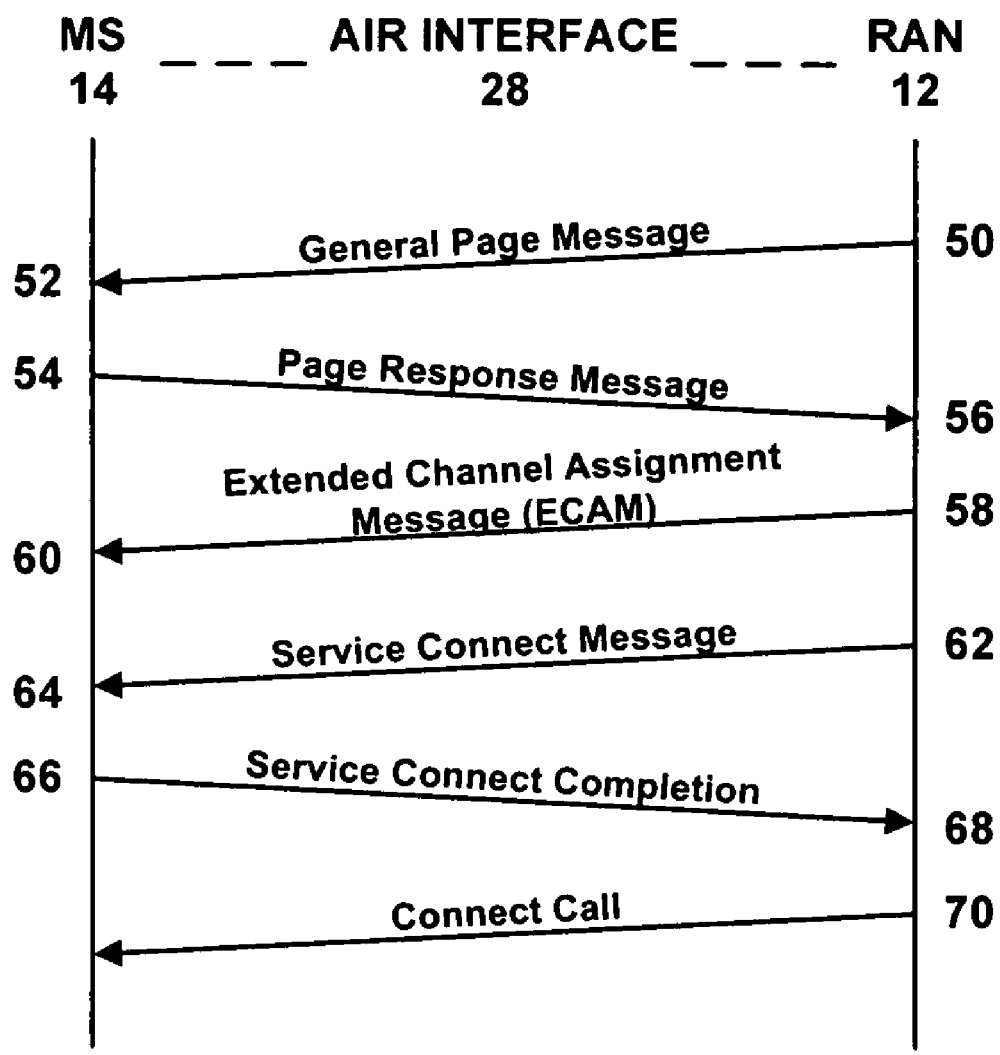
FIG. 2 illustrates an exemplary signaling message flow diagram for setting up a call with a mobile station via a radio access network.

FIG. 2 illustrates an exemplary signaling message flow diagram for setting up a call with a mobile station 14 via the RAN 12. (As note above, the term "call" may be used interchangeably with the term "communication"). For purposes of illustration, the call set up in FIG. 2 may be conducted over a paging channel and an access channel, according to a CDMA protocol.

The RAN 12 may initiate the call set up with the mobile station 14 in response to receiving a request from an endpoint to set up a call of a particular type with one of the mobile stations 14 in a given wireless coverage area. At step 50, after receiving the request, the RAN 12 may generate a General Page Message (e.g., a Page Request Message such as an SO35 page for location requests) and transmit it to the mobile station 14 via the air interface 28. In turn, at step 52, the mobile station 14 may receive the General Page Message, and at step 54, the mobile station 14 may responsively generate and transmit a Page Response Message to the RAN 12, via the air interface 28, indicating the mobile station's availability to receive the communication.

At step 56, the RAN 12 may receive the Page Response Message from the mobile station 14. In response, at step 58 the RAN 12 may begin assigning a channel element to the call by (i) designating an available channel element and corresponding channel for assignment to the communication, (ii) generating an Extended Channel Assignment Message (ECAM) containing an identifier of the channel element that directs the mobile station 14 to tune to the correspond channel, and (iii) transmitting the ECAM to the mobile station 14 via the air interface 28. In turn, at step 60, the mobile station 14 may receive the ECAM from the RAN 12 and responsively acquire the channel defined by the assigned channel element.

At step 62, once the mobile station 14 has been assigned a channel element, the RAN 12 may generate and transmit a Service Connect Message to the mobile station 14. At step 64, the mobile station 14 may receive the Service Connect Message, and in turn may notify a user of an incoming call. If the user of the mobile station then accepts the call, at step 66, the mobile station 14 may generate and transmit a Service Connect Completion to the RAN 12. At step 68, the RAN 12 may receive the Service Connect Completion from the mobile station 14. Finally, at step 70, RAN 12 may connect the endpoint that requested the call set up with the mobile station 14, via the air interface 28, and the call may begin.

Referring back to FIG. 1, the network 10 may also include the positioning system 30, with which the RAN 12 communicates over a signaling network 32 (e.g., a Signaling System #7 (SS7) network). The core of the positioning system 30 may be a mobile positioning center (MPC) 34 that functions to determine and report mobile station 14 locations to requesting entities (e.g., location-based service (LBS) applications). The MPC may also include or have access to a position determining entity (PDE) 36 that functions to determine the location of a given mobile station 14 based on (i) the centroid of the cell/sector in which the mobile station 14 is currently operating and (ii) satellite-based positioning information provided by the mobile station 14. FIG. 1 depicts the MPC 34 and PDE 36 as components of a positioning system 30, but the positioning system 30 can take other forms, possibly including just one of these entities or some other entities altogether. The positioning system 30 may also couple to a location server 38 that functions to receive location requests from the requesting entities and forward those requests to the MPC 34 and/or PDE 36. The location requests may take the form of low-accuracy requests, which seek the cell/sector currently serving a mobile station 14, or high-accuracy requests, which seek a more specific geographic position of the mobile station 14 (e.g., global positioning system (GPS) or advanced forward link trilateration (AFLT) coordinates).

When the positioning system 30 receives a location request from the location server 38, the positioning system 30 may first communicate with a home location register (HLR) 40, via the signaling network 32, to determine the RAN 12 currently serving the mobile station 14 identified in a location request. Once the proper RAN 12 is determined, the positioning system 30 may then communicate with the RAN 12, via the signaling network 32, to determine the location of the mobile station 14. Depending on the type of location request and the status of the mobile station 14, the RAN 12 may need to initialize a location determination session and assign the mobile station 14 a channel, defined by a channel element, to carry out this process. Accordingly, as location requests (as well as requests for other new communication types) become more frequent, the RAN's limited supply of channel elements may become monopolized by location determination sessions/requests. This monopolization may harm the network 10 by preventing the network 10 from servicing other communication types (e.g., voice calls).

The exemplary embodiments of the present invention may help to avoid this potential harm to the network 10 by assigning a channel element to a communication based on the type of the communication requiring the channel element. In order to carry out the invention, the RAN 12 will maintain in data storage (i) the type of each communication presently assigned a channel element, and (ii) a predetermined threshold for each type of communication that represents the maximum proportion of total channel elements for a given wireless coverage area assignable to communications of each possible type. (As used herein, the term "total" may be defined in many ways, including any subsection of the channel elements that the present invention is implemented to assign). As such, when the RAN 12 receives a request to set up a communication of a particular type with a mobile station 14 in a given wireless coverage area, the RAN 12 may then (i) determine the proportion of channel elements for the given wireless coverage area that are presently assigned to communications of the particular type, (ii) determine whether that proportion exceeds (i.e., meets or exceeds) the predetermined threshold for communications of the particular type, and (iii) assign a channel element for the given wireless coverage area to the communication if the proportion does not exceed the predetermined threshold. Advantageously, the present invention allows an administrator of the network 10 to limit the proportion of active communications of any particular type, in order to prevent communications of a particular type (e.g., location determination sessions/requests) from monopolizing the resources of the network 10.

Figure 3:
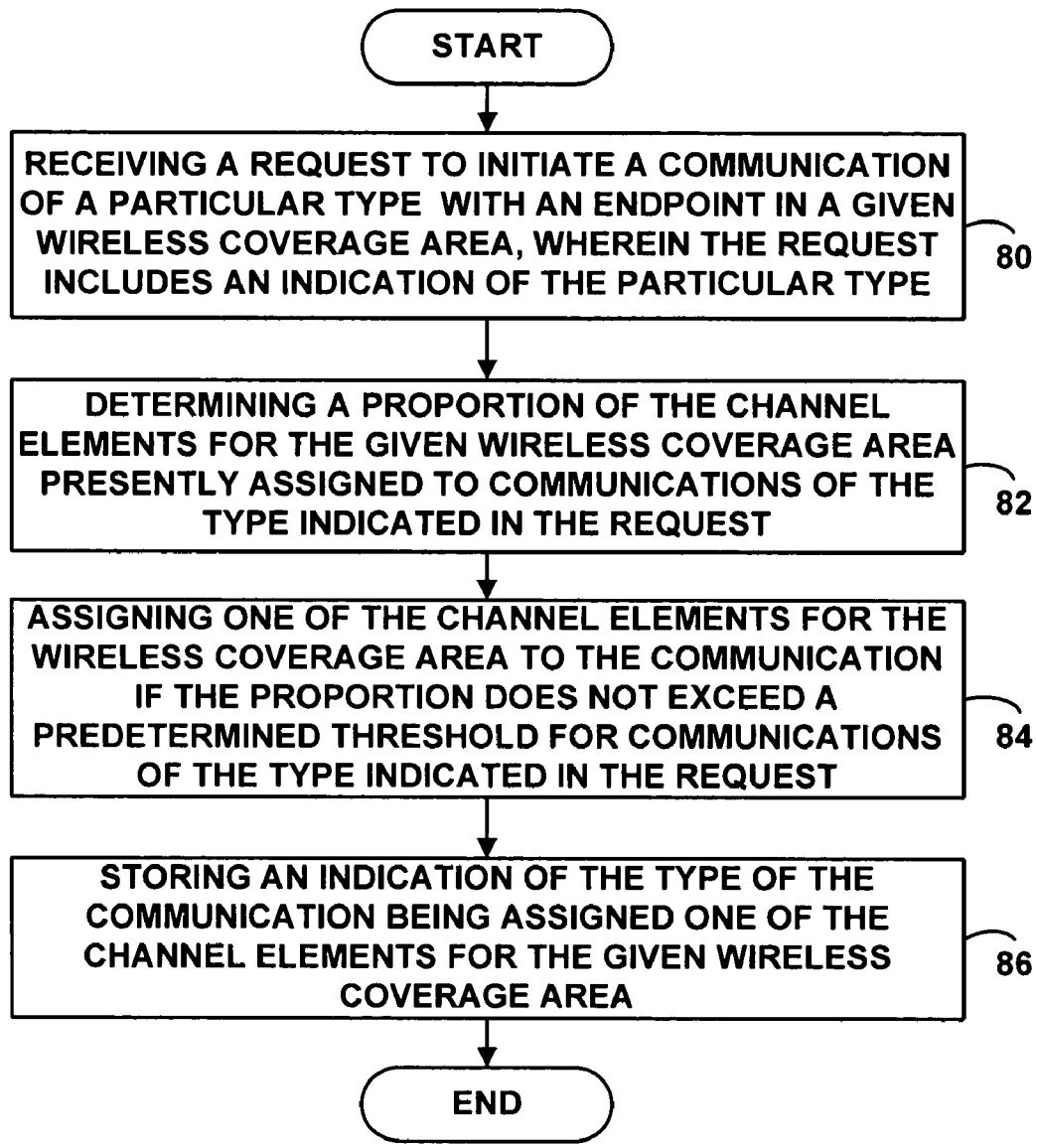
FIG. 3 is a flow chart depicting operation of a radio access network in accordance with an exemplary embodiment of the present invention.

FIG. 3 is a flow chart depicting functionality of the RAN 12 in accordance with an exemplary embodiment of the present invention. At block 80, the RAN 12 may receive a request message to set up a communication of a particular type with a mobile station 14 in a given wireless coverage area of the RAN 12, wherein the request includes an indication of the particular type. The RAN 12 may receive the request from one of various network entities, including but not limited to the PSTN 16, the packet-switched network 18, and the positioning system 30. Further, the request may seek to set up a variety of different types of communication, including but not limited to a voice call, a data session, a Short Message Service (SMS) message transmission, or a location determination session/request such as the low-accuracy and high-accuracy requests described above.

At block 82, after receiving the request, the RAN 12 may determine a proportion of channel elements for the given wireless coverage area that are presently assigned to communications of the type indicated in the request. Preferably, the RAN 12 will determine the proportion in response to receiving the request. Alternatively, however, the RAN 12 may determine the proportion in response to receiving, generating, or transmitting other signaling messages relating to the set up of the communication, or the RAN 12 may determine the proportion after a predetermined time period has elapsed since the reception of the request.

In any case, to determine the proportion, the RAN 12 may first determine (i) a first quantity of the total channel elements for the given wireless coverage area, and (ii) a second quantity of channel elements for the given wireless coverage area that are presently assigned to communications of the type indicated in the request. Thereafter, the RAN 12 may divide the second quantity by the first quantity to determine the proportion of the channel elements for the given wireless coverage area that are presently assigned to communications of the type indicated in the request. It should be understood, however, that the RAN 12 may use other methods or algorithms for determining the proportion as well. Further, it should be understood that the RAN 12 may determine the proportion with respect to all of the channel elements for the given wireless coverage area, or the RAN 12 may determine the proportion with respect to a subset of the channel elements for the given wireless coverage area.

At block 84, after the RAN 12 determines the proportion, the RAN 12 may assign one of the channel elements for the wireless coverage area to the communication if the proportion does not exceed a predetermined threshold for communications of the type indicated in the request. The predetermined threshold preferably represents the maximum proportion of channel elements for any given wireless coverage area that the RAN 12 will assign to communications of a particular type, and may be established by a network administrator or other operator of the RAN 12. Further, the predetermined threshold may be expressed in a variety of formats, including percentages, fractions, or decimals.

If the RAN 12 determines that the proportion does not exceed the predetermined threshold, the function of assigning a channel element for the given wireless coverage area to the communication may take different forms, depending on the implementation of the invention. In one implementation, the RAN 12 may not transmit any signaling messages to the mobile station 14 before the function of assigning the channel element, and the RAN 12 may then assign the channel element by (i) generating and transmitting a first signaling message to the mobile station 14 indicating the request to set up the communication with the endpoint (e.g., General Page Message), (ii) receiving a second signaling message from the mobile station 14 indicating the availability of the mobile station 14 (e.g., Page Response Message), and (iii) generating and transmitting a third signaling message to the mobile station 14 indicating the identity of the channel element being assigned to the communication (e.g., ECAM). In another implementation, the RAN 12 may transmit the first signaling message to the mobile station 14 and receive the second signaling message from the mobile station 14 before the function of assigning the channel element, and the RAN 12 may then assign the channel element by (i) generating and transmitting the third signaling message to the mobile station 14. In yet another implementation, the RAN 12 may transmit the first signaling message, receive the second signaling message, and generate the third signaling message before the function of assigning the channel element, and the RAN 12 may then assign the channel element by transmitting the third signaling message to the mobile station 14. Other implementations and examples for assigning the channel element are possible as well.

At block 86, if the RAN 12 assigns one of the channel elements for the wireless coverage area to the communication at block 84, the RAN 12 may store an indication of the type of the communication being assigned the channel element. For example, if the third signaling message of block 84 contains an indication of the type of the communication being assigned the channel element, the RAN 12 may store the indicated type in data storage. Alternatively, if the third signaling message does not contain an indication of the type of the communication being assigned the channel element, the RAN 12 may (i) correlate the first signaling message (which preferably includes an indication of the type of the communication) with the third signaling message to determine the type of the communication being assigned the channel element, and (ii) store the determined type of the communication in data storage. In either case, once the RAN 12 stores the indication of the type of the communication being assigned the channel element for the given wireless coverage area, the RAN 12 may rely on that information when it receives a future request to set up a communication of the same type. However, once the communication no longer requires the channel element, the RAN 12 may delete the indication of the type of the communication.

Figure 4:
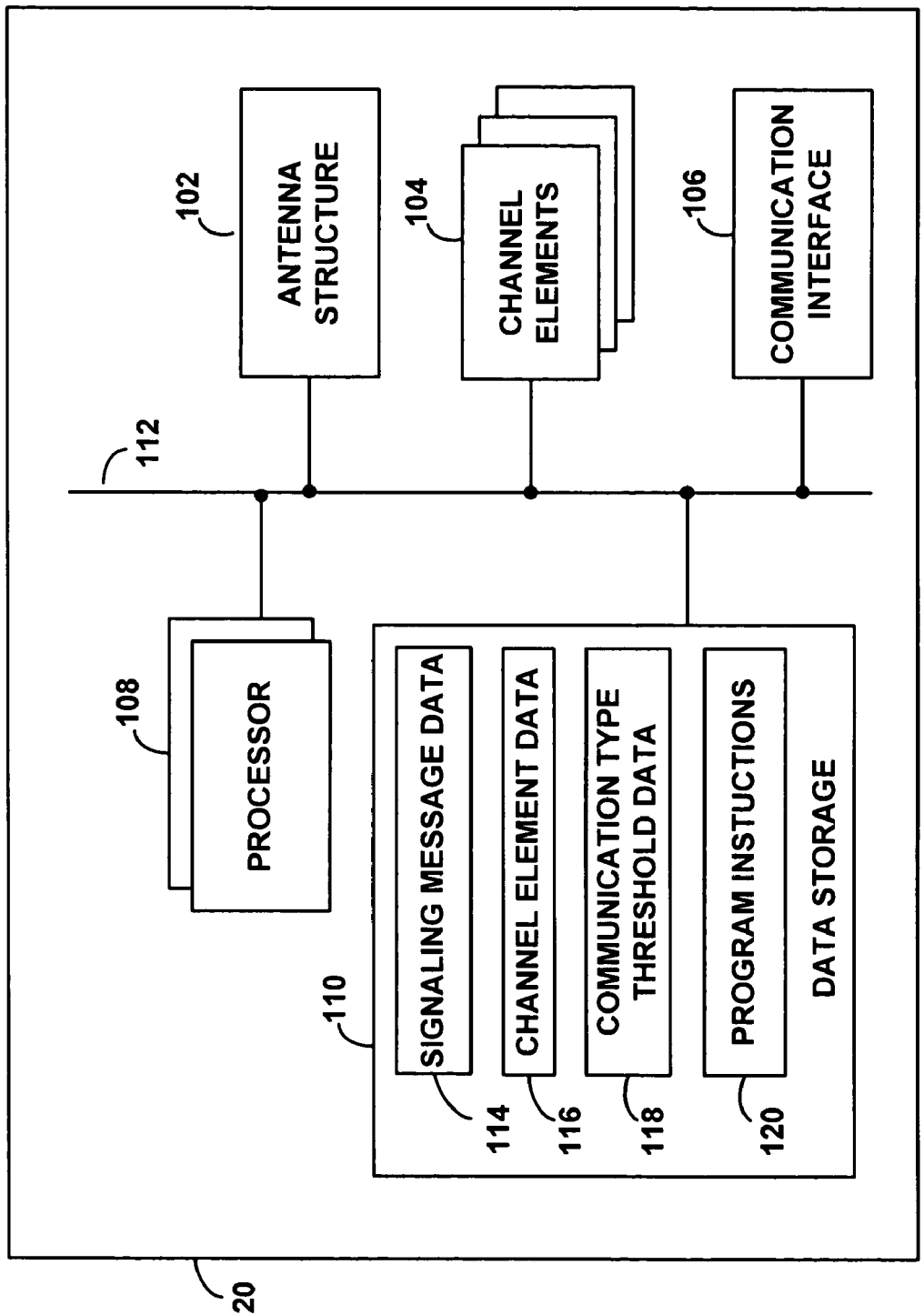
FIG. 4 is a simplified block diagram of a base transceiver station arranged to carry out an exemplary embodiment of the invention.

The functionality of the present invention may be implemented in one or more entities of the RAN 12, including but not limited to the BTS 20, the BSC 22, and/or the MSC 24. In the preferred embodiment, however, the BTS 20 may carry out the functions of the preferred embodiment because the BTS 20 contains the channel elements. Accordingly, FIG. 4 is a simplified block diagram of a BTS 20 arranged to carry out an exemplary embodiment of the invention. The BTS 20 may comprise an antenna structure 102, channel elements 104, a BSC interface 106, a processor 108, and data storage 110, all linked together via a system bus, network, or other connection mechanism 112.

Referring to FIG. 4, the antenna structure 102 of the BTS 20 may provide a means for communicating with the mobile stations 14 over the air interface 28. For example, the antenna structure 102 may receive communications from the channel elements 104 and responsively transmit the communication over the air interface 28, or the antenna structure 102 may receive communications over the air interface 28 and responsively send the communication to the channel elements 104. The antenna structure 102 may be arranged in various ways. For example, the antenna structure 102 may include one or more antennas. In one respect, the one or more antennas may include one or more omni-directional antennas and/or one or more directional (e.g., sectored) antennas. In another respect, the one or more antennas may include one or more antennas for receiving RF signals and one or more antennas for transmitting RF signals away from the antenna structure 102. The RF signals transmitted away from the antenna structure 102 may form one or more given wireless coverage areas, each of which is served by a different set of channel elements 104.

Each set of the channel elements 104 is preferably implemented together in hardware and associated software as one or more channel element cards (not shown). FIG. 4 only illustrates one set of channel elements 104, which corresponds to one wireless coverage area. It should be understood, however, that the BTS 20 may contain multiple sets of channel elements 104, each of which may correspond to one or more different wireless coverage areas. (A wireless coverage area may be defined by, among other things, a cell, a cell sector, a carrier frequency, or some combination thereof). As such, the BTS 20 may manage each set of the channel elements separately according to the present invention, or the BTS 20 may manage all channel elements 104 of the BTS 20 together according to the present invention.

As discussed above, the channel elements 104 may define a plurality of channels on the air interface 28 for carrying communications between the mobile stations 14 and the BTS 20. Further, once the BTS assigns a channel element 104 to a communication carried on the corresponding air interface channel, the channel element 104 may support the communication by performing many functions, including but not limited to forward-link encoding and modulation, data symbols addition, forward power gain adjustment, reverse-link demodulation, frame quality determination, and reverse power control. Further yet, the channel elements 104 may provide an interface between the antenna structure 102 and the BSC interface 106 of the BTS 20, which in turn comprises an interface for communicating with the BSC 22 of the RAN 12.

The processor 108 may comprise one or more general purpose microprocessors and/or dedicated signal processors. (The term "processor" encompasses either a single processor or multiple processors that could work in combination.) Data storage 110, in turn, may comprise memory and/or other storage components, such as optical, magnetic, organic or other memory or disc storage, which can be integrated in whole or in part with the processor 108. Alternatively, data storage 110 may be remote from the processor 108 and coupled to the processor 108 by the connection mechanism 112.

Data storage 110 preferably contains or is arranged to contain, for each given wireless coverage area of the BTS 20, (i) signaling message data 114, (ii) channel element data 116, (iii) communication type threshold data 118, and (iv) program instructions 120. As such, although FIG. 4 only illustrates one set of these data storage elements, data storage 110 may contain multiple sets of these data storage elements depending on how many given wireless coverage areas the BTS 20 defines. Further, although these components are described herein as separate data storage elements, the elements could just as well be physically integrated together or distributed in various other ways. In a preferred embodiment, however, the signaling message data 114, the channel element data 116, and the communication type threshold data 118 would be maintained in data storage 110 separate from the program instructions 120, for easy updating and reference by the program instructions 120.

Signaling message data 114 may contain information relating to call set up signaling messages passing through the BTS 20. As an example, for each call set up signaling message passing through the BTS 20, channel element data 82 may contain an indication of the type of signaling message (e.g., SO35 page, SO35 page response, etc.), an identifier of the endpoint that requested the call set up (e.g., Mobile Identification Number (MIN), International Mobile Station Identifier (IMSI), point code, etc.), an identifier of the mobile station 14 to which the call is being set up (e.g., MIN, IMSI, point code, etc.), and an indication of the type of call being set up (e.g., a service option code). In addition, for some signaling messages passing through the BTS 20, signaling message data 114 may also contain the signaling message itself. Preferably, the signaling message data 114 may contain information relating to request messages, response messages, and channel assignment messages. As described in more detail below, the BTS 20 may then use the signaling message data 114 for various functions.

Channel element data 116 may contain information relating to the channel elements 104 of the BTS 20. As one example, for each channel element 104 of the BTS 20, channel element data 116 may contain an identifier of the channel element 104 and an indication of the status of the channel element 104 (e.g., assigned, unassigned). As another example, for each channel element 104 assigned to a communication, channel element data 116 may contain an identifier of the endpoint that originated the communication (e.g., MIN, IMSI, point code, etc.), an identifier of the mobile station that accepted the communication (e.g., MIN, IMSI, point code, etc.), and an indication of the type of the communication that has been assigned the channel element 104 (e.g., a service option code). Other examples are possible as well.

The communication type threshold data 118 may contain, for each possible type of communication that may be assigned channel element of the BTS 20, a threshold representing the maximum proportion of total channel elements 104 the BTS 20 will assign to communications of that type. The communication type threshold data 118 for each communication type may be expressed in a variety of formats, including percentages, fractions, or decimals. Preferably, however, the communication type threshold data 118 for each communication type will be represented in one standard format. For example, assuming the standard format is percentages, the communication type threshold data 118 may contain the following thresholds:

| Communication Type | Threshold |
|---|---|
| Voice | 100% |
| 1x Data | 40% |
| SMS | 10% |
| Location services | 5% |

Of course, many other examples are possible as well. In a preferred embodiment, the communication type threshold data 118 for location services will be smaller than the communication type threshold data 118 for other types of communications, to prevent location determination sessions/requests from monopolizing the channel elements 104.

The communication type threshold data 118 may be set manually by an operator of the BTS 20 (e.g., a network administrator), or the communication type threshold data 118 may be established automatically by the BTS 20 based on a variety of factors. Other methods for establishing the communication type threshold data 118 are possible as well. In any case, as described in more detail below, the BTS 20 may use the communication type threshold data 118 to determine whether to assign a channel element 104 to a communication of a particular type.

The program instructions 120 may take the form of a set of program logic that can be executed or interpreted by processor 108 to carry out functions of the exemplary embodiment. The program instructions 120 may include, without limitation, message-handling logic, message-correlation logic, channel element monitoring logic, and/or channel element assignment logic. It should be understood, however, that the program logic and its associated functions are described herein by way of example only. As such, those skilled in the art will appreciate that other program logic and/or functions may be used instead, some program logic and/or functions may be added, and some program logic and/or functions may be omitted altogether. Further, as noted above, the various functions described herein can alternatively be embodied in hardware and/or firmware.

The program instructions 120 may include message-handling logic that defines a mechanism to allow the BTS 20 to handle signaling messages passing through the BTS 20. As one example, after the BTS 20 receives a signaling message via the antenna structure 102, the message-handling logic may cause the BTS 20 to send the received signaling message to the BSC interface 106 and then transmit the received signaling message via the BSC interface 106 to the BSC 22. Similarly, after the BTS 20 receives a signaling message via the BSC interface 106, the message-handling logic may cause the BTS 20 to send the received signaling message to the antenna structure 102 and then transmit the received signaling message via the antenna structure 102 to one of the mobile stations 14. However, if and when the message-handling logic causes the BTS 20 to transmit a received signaling message may depend on a number of factors, including the embodiment of the invention, the type of signaling message received, and channel element assignment logic described below.

As another example, after the BTS 20 receives a signaling message over either the antenna structure 102 or the BSC interface 106, the message-handling logic may cause the BTS 20 to store information relating to the received signaling message as signaling message data 114 in data storage 110. The information that the message-handling logic causes the BTS 20 store may depend on the type of the signaling message, and for some received signaling messages the BTS 20 may not store any information relating to the signaling message. Further, depending on the embodiment of the present invention, the message-handling logic may cause the BTS 20 to temporarily store the received signaling message as signaling message data 114 in data storage 110.

As yet another example, the message-handling logic may cause the BTS 20 to delete previously stored signaling message data 114 from data storage 110 in response to various triggers. As one possibility, the message-handling logic may cause the BTS 20 to delete some or all of the signaling message data 114 for a signaling message in response to the transmission of the signaling message. As another possibility, the message-handling logic may cause the BTS 20 to delete some or all of the signaling message data 114 for a signaling message in response to the signaling message data 114 remaining in data storage 110 for some predetermined length of time. As yet another possibility, the message-handling logic may cause the BTS 20 to delete some or all of the signaling message data 114 for a first signaling message in response to the BTS 20 receiving a second signaling message that relates to the same call set up as the first signaling message. As a further possibility, the message-handling logic may cause the BTS 20 to delete some or all of the signaling message data 114 for a call set up signaling message in response to the channel element assignment logic determining that the BTS 20 will not assign a channel element 104 to the call. Other triggers for deleting signaling message data 114 are possible as well.

The program instructions 120 may also include message-correlation logic that defines a mechanism to allow the BTS 20 to correlate a first signaling message and its associated information with one or more subsequent signaling messages, in response to receiving the one or more subsequent signaling messages. In typical operation, the BTS 20 may receive a series of signaling messages that are all part of the same call set up, but not all of the signaling messages may contain the same information. For example, referring to FIG. 2, the General Page Message transmitted by the BTS 20 at step 50 may contain an indication of the type of communication being set up (e.g., a service option code), whereas the Page Response Message received by the BTS 20 at step 56 and the ECAM transmitted by the BTS 20 at step 58 may not contain an indication of the type of communication being set up. As such, the message-correlation logic may cause the BTS 20 to correlate the General Page Message, and its indication of communication type, with the Page Response message and/or the ECAM. Based on this correlation, the BTS 20 may be able to determine the type of the communication that the BTS 20 has assigned a channel element 104 to, and may further be able to store an indication of the type of the communication as channel element data 116 in data storage 110.

More particularly, in response to receiving the Page Response Message at step 56 or generating the ECAM at step 58, the message-correlation logic may first cause the BTS 20 to locate in data storage 110 the signaling message data 114 for the General Page Message that is part of the same call set up as the Page Response Message or ECAM. For example, the BTS 20 may compare the identifier of the mobile station 14 for the Page Response Message or ECAM to the signaling message data 114 for each General Page Message in data storage 110, until the BTS 20 locates the signaling message data 114 for the General Page Message that is part of the same call set up. In turn, the message-correlation logic may cause the BTS 20 to identify the information in signaling message data 114 for the General Page Message that cannot be determined from the Page Response Message or ECAM (e.g., service option code). The message-correlation logic may then cause the BTS 20 to provide the identified information to the message-handling logic, which may in turn store the identified information as signaling message data 114 for the Page Response Message or ECAM, along with the other information relating to the Page Response Message or ECAM (that the BTS 20 determines directly from those signaling messages). Alternatively, in the case of the ECAM, the message-correlation logic may cause the BTS 20 to provide certain identified information (e.g., service option code) to the channel element monitoring logic.

The program instructions 120 may include channel element monitoring logic that defines a mechanism to allow the BTS 20 to monitor and update the channel element data 116 in data storage 110. As an example, after the BTS 20 assigns a channel element 104 to a communication, the channel element monitoring logic may cause the BTS 20 to (i) determine relevant information about the assigned channel element 104, (ii) locate the channel element data 116 in data storage 110 for the assigned channel element 104, and (iii) update the channel element data 116 for the assigned channel element 104. More particularly, with reference to FIG. 2, the BTS 20 may determine the relevant information about the assigned channel element 104 from a variety of sources, including the contents of the ECAM transmitted at step 58, the signaling message data 114 for the ECAM, and/or information relating to the ECAM provided by the message-correlation logic described above. Regardless of the source, once the BTS 20 has determined the relevant information about the assigned channel element 104, preferably including an identifier of the assigned channel element 104, the BTS 20 may then locate the channel element data 116 for the assigned channel element 104 based on that identifier. In turn, once the BTS 20 locates the channel element data 116 for the assigned channel element 104, the BTS 20 may update the channel element data 116 by, among other things, (i) changing the indication of status for the channel element 104 from "unassigned" to "assigned," (ii) storing the identifiers of the endpoints engaged in the communication that has been assigned the channel element 104, and (iii) storing the indication of the type of the communication being assigned the channel element 104.

As another example, if the BTS 20 receives an indication that a communication no longer requires a channel element 104 and the channel element 104 is released, the channel element monitoring logic may cause the BTS 20 to (i) locate the channel element data 116 for the released channel element 104 in data storage 110, and (ii) update the channel element data 116 for the released channel element 104. More particularly, once the BTS 20 receives the indication that the channel element 104 has been released, preferably including an identifier of the released channel element 104, the BTS 20 may then locate the channel element data 116 in data storage 110 for the released channel element 104 based on that identifier. In turn, the BTS 20 may update the channel element data 116 for the released channel element 104 by, among other things, (i) changing the indication of status for the channel element 104 from "assigned" to "unassigned," and (ii) deleting the remainder of the channel element data 116 for the released channel element 104.

As yet another example, after the BTS 20 receives a first signaling message from the BSC 22 requesting to set up a communication of a particular type with a mobile station 14, the channel element monitoring logic may cause the BTS 20 to determine the proportion of total channel elements 104 currently assigned to communications of a particular type. (As noted above, the term "total" may include any subsection of the channel elements that the present invention is implemented to assign). Typically, the channel element monitoring logic may cause the BTS 20 to determine the proportion in response to the BTS 20 receiving the first signaling message from the BSC 22. Alternatively, however, the channel element monitoring logic may cause the BTS 20 to determine the proportion in response to the BTS 20 receiving or transmitting other signaling messages relating to the set up of the communication, or the channel element monitoring logic may cause the BTS 20 to determine the proportion after a predetermined time period has elapsed since the reception of the first signaling message.

More particularly, after the BTS 20 receives the first signaling message, preferably including an indication of the type of the communication, the channel element monitoring logic may first cause the BTS 20 to determine its total number of channel elements 104. The BTS 20 may determine its total number of channel elements 104 by referring to a value programmed in advance that represents the total number of channel elements 104. Alternatively, the BTS 20 may determine its total number of channel elements 104 by counting the total number of channel element identifiers in data storage 110 each time the channel element assignment logic sends a request. Alternatively yet, after the BTS 20 determines its total number of channel elements 104 once, the BTS 20 may store the total number of channel elements 104 in data storage 110 and refer to that number each time the channel element monitoring logic determines the proportion. Other methods for determining the total number of channel elements 104 are possible as well.

In any case, once the BTS 20 determines its total number of channel elements 104, the channel element monitoring logic may then cause the BTS 20 to determine the number of channel elements 104 presently assigned to communications of the type indicated in the first signaling message. The BTS 20 may determine the total number of channel elements 104 presently assigned to communications of the indicated type by (i) accessing the channel element data 116 for each assigned channel element 104, (ii) comparing the indicated type to the indication of the type stored as channel element data 116, and (iii) counting the number of matches. Other methods for determining the total number of channel elements 104 presently assigned to communications of the indicated type are possible as well.

Once the BTS 20 determines the total number of channel elements 104 presently assigned to communications of the type indicated in the first signaling message, the channel element monitoring logic may then cause the BTS 20 to divide the total number of channel elements 104 presently assigned to communications of the indicated type by the total number of channel elements 104 in the BTS 20, resulting in the proportion of channel elements 104 presently assigned to communications of the type indicated in the first signaling message. The channel element monitoring logic may then responsively send an indication of the determined proportion (e.g., a numeric value) to the channel element assignment logic, which may in turn use the indication of the proportion to determine whether to assign a channel element 104 to the communication requiring the channel element 104.

The program instructions 120 may further include channel element assignment logic that defines a mechanism to allow the BTS 20 to assign channel elements 104 to communications, based on the type of the communication requiring the channel element 104. After the channel element assignment logic receives the indication of the proportion of channel elements 104 presently assigned to communications of the type indicated in the first signaling message, as determined by the channel element monitoring logic, the channel element assignment logic may cause the BTS 20 to (i) access the communication type threshold data 118 for the type of the communication indicated in the first signaling message, (ii) compare the proportion to the communication type threshold data 118 to determine whether the proportion does not exceed the communication type threshold data 118, and (iii) determine whether the BTS 20 will assign a channel element 104 based on the comparison. If the BTS 20 will assign a channel element 104, the channel element assignment logic may then cause the BTS 20 to transmit the necessary call set up signaling messages (via the message-handling logic) to assign a channel element 104 to the call. Alternatively, if the BTS 20 will not assign a channel element 104, the channel element assignment logic may then cause the BTS 20 to delete any signaling message data 114 relating to the call set up (including any temporarily stored signaling messages) and cease transmitting any received signaling messages relating to the call set up, thus terminating the call set up.

EXAMPLES

The functions of the present invention may be carried out by different entities of the RAN 12 at different points during a call set up, depending on the preferences of the network administrator or other operator of the RAN 12. As such, different examples of the present invention will now be described with reference to FIG. 2. In each of the following examples, the MSC 24 will function to generate all signaling messages (e.g., Page Message Request, Page Message Response, ECAM, etc.) for the RAN 12, the BSC 22 will function to pass signaling messages between the MSC 24 and the BTS 20, and the BTS 20 will function to carry out all other functions of the present invention in accordance with the description above. It should be understood, however, that any entity of the RAN 12 may carry out any function of the present invention, at various points during the call set up, and the following examples are provided for illustration only.

In one example of the present invention, before transmitting the General Page Message to the mobile station 14 at step 50, the BTS 20 may (i) determine the proportion of channel elements 104 presently assigned to communications of the type indicated in the General Page Message, and (ii) determine whether the BTS 20 will assign a channel element 104 to the call by determining whether the proportion does not exceed the predetermined threshold for communications of the type indicated in the General Page Message. In order to carry out these functions before transmitting the General Page Message at step 50, the BTS 20 may need to temporarily store the General Page Message in data storage 110 until the functions are complete. Thereafter, if the BTS 20 will assign a channel element 104 to the call, the BTS 20 may carry out the function of assigning the channel element 104 by transmitting (i) the General Page Message to the mobile station 14 at step 50, (ii) the Page Response Message to the BSC 22 at step 56, and (iii) the ECAM to the mobile station 14 at step 58. Alternatively, however, if the BTS 20 will not assign a channel element 104 to the call, the BTS 20 may delete the General Page Message from data storage without transmitting it to the mobile station 14 at step 56, thus terminating the call set up.

In another example, the BTS 20 may first transmit the General Page Message at step 50 in response to receiving the General Page Message. Further, at any time before transmitting the Page Response Message to the BSC 22 at step 56, the BTS 20 may (i) determine the proportion of channel elements 104 presently assigned to communications of the type indicated in the General Page Message, and (ii) determine whether the BTS 20 will assign a channel element 104 to the call by determining whether the proportion does not exceed the predetermined threshold for communications of the type indicated in the General Page Message. In order to carry out these functions before transmitting the Page Response Message at step 56, the BTS 20 may need to temporarily store the Page Response Message in data storage 110 if the BTS 20 receives the Page Response Message from the mobile station 14 before the functions are complete. Thereafter, if the BTS 20 will assign a channel element 104 to the call, the BTS 20 may carry out the function of assigning the channel element 104 by transmitting (i) the Page Response Message to the BSC 22 at step 56, and (ii) the ECAM to the mobile station 14 at step 58. Alternatively, however, if the BTS 20 will not assign a channel element 104 to the call, the BTS 20 may either ignore the Page Response Message when the BTS 20 receives the message, or the BTS may delete the Page Response Message from data storage 110. In either case, the BTS 20 will not transmit the Page Message Response to the BSC 22 at step 56, thus terminating the call set up.

In yet another example, the BTS 20 may (i) transmit the General Page Message to the mobile station 14 at step 50 in response to receiving the General Page Message, and (ii) transmit the Page Response Message to the BSC 22 at step 56 in response to receiving the Page Response Message. Further, at any time before transmitting the ECAM to the mobile station 14 at step 58, the BTS 20 may (i) determine the proportion of channel elements 104 presently assigned to communications of the type indicated in the General Page Message, and (ii) determine whether the BTS 20 will assign a channel element 104 to the call by determining whether the proportion does not exceed the predetermined threshold for communications of the type indicated in the General Page Message. In order to carry out these functions before transmitting the ECAM at 56, the BTS 20 may need to temporarily store the ECAM in data storage 110 if the BTS 20 receives the ECAM from the BSC 22 before the functions are complete. Thereafter, if the BTS 20 will assign a channel element 104 to the call, the BTS 20 may carry out the function of assigning the channel element 104 by transmitting the ECAM to the mobile station 14 at step 58. Alternatively, however, if the BTS 20 will not assign a channel element 104 to the call, the BTS 20 may either ignore the ECAM when the BTS 20 receives the message, or the BTS may delete the ECAM from data storage 110. In either case, the BTS 20 will not transmit the ECAM to the mobile station 14 at step 58, thus terminating the call set up.

In any of the above examples, the BTS 20 may store signaling message data 114 for each signaling message the BTS 20 receives (e.g., General Page Message, Page Response Message, ECAM, etc.). Further, in any of the above examples, after the BTS 20 assigns the channel element 104 to the call, the BTS 20 may store new channel element data 116 for the channel element 104 which includes the identifier of the type of the communication being assigned the channel element 104. In order to carry out this function, the BTS 20 may need to correlate the General Page Message, and its corresponding signaling message data 114, with the ECAM. The channel element data 116 for the assigned channel element 104 may then remain in data storage 110 until the call no longer requires the channel element 104, and may be relied upon by the BTS 20 the next time a call of the same type requires a channel element 104.

Exemplary embodiments of the present invention have been described above. Those skilled in the art will understand, however, that changes and modifications may be made to the embodiments described without departing from the true scope and spirit of the present invention, which is defined by the claims.

We claim:

1. A method for assigning channel elements in a radio access network serving one or more endpoints in one or more given wireless coverage areas, the method comprising:
receiving a request to set up a communication of a particular type with an endpoint in a given wireless coverage area, wherein the request includes an indication of the particular type;
determining a proportion of the channel elements for the given wireless coverage area that are presently assigned to communications of the type indicated in the request;
assigning one of the channel elements for the given wireless coverage area to the communication if the proportion does not exceed a predetermined threshold for communications of the type indicated in the request; and
storing an indication of the type of the communication being assigned one of the channel elements for the given wireless coverage area.

2. The method of claim 1, wherein:
the request is received from a mobile positioning center;
the indicated type is a location query;
the endpoint is a mobile station; and
the predetermined threshold for location queries is five percent.

3. The method of claim 1, further comprising deleting the stored indication of the type of the communication if the communication no longer requires the channel element for the given wireless coverage area.

4. The method of claim 1, further comprising recording the indication of the particular type in data storage in response to receiving the request.

5. The method of claim 1, wherein the function of determining the proportion of the channel elements for the given wireless coverage area that are presently assigned to communications of the type indicated in the request occurs in response to receiving the request.

6. The method of claim 1, wherein the function of assigning one of the channel elements for the given wireless coverage area to the communication comprises:
generating a first signaling message indicating the request to set up the communication with the endpoint, wherein the first signaling message includes an indication of the type indicated in the request;
transmitting the first signaling message to the endpoint;
receiving a second signaling message from the endpoint indicating the availability of the endpoint;
generating a third signaling message indicating the identity of the channel element assigned to the communication; and
transmitting the third signaling message to the endpoint.

7. The method of claim 6, wherein the third signaling message does not include an indication of the type of the communication being assigned the channel element, and wherein the function of storing an indication of the type of the communication being assigned one of the channel elements for the given wireless coverage area comprises:
correlating the first signaling message with the third signaling message to determine the type of the communication being assigned the channel element; and
recording in data storage the identity of the assigned channel element and an indication of the type of the communication being assigned the channel element.

8. The method of claim 1, further comprising:
generating a first signaling message indicating the request to set up the communication with the endpoint in response to receiving the request, wherein the first signaling message includes an indication of the type indicated in the request;
transmitting the first signaling message to the endpoint in response to generating the first signaling message; and
receiving a second signaling message from the endpoint indicating the availability of the endpoint.

9. The method of claim 8, wherein the function of assigning one of the channel elements to the communication comprises:
generating a third signaling message indicating the identity of the channel element assigned to the communication; and
transmitting the third signaling message to the endpoint.

10. The method of claim 9, wherein the third signaling message does not include an indication of the type of the communication being assigned the channel element, and wherein the function of storing an indication of the type of the communication being assigned one of the channel elements for the given wireless coverage area comprises:
correlating the first signaling message with the third signaling message to determine the type of the communication being assigned the channel element; and
recording in data storage the identity of the assigned channel element and an indication of the type of the communication being assigned the channel element.

11. The method of claim 1, wherein the function of determining a proportion of the channel elements for the given wireless coverage area that are presently assigned to communications of the type indicated in the request comprises:
determining a first quantity of the total channel elements for the given wireless coverage area;
determining a second quantity of the channel elements for the wireless coverage area that are presently assigned to communications of the type indicated in the request; and
dividing the second quantity by the first quantity.

12. The method of claim 1, wherein the radio access network comprises:
a base station transceiver;
a base station controller;
a mobile switching center; and
a packet data serving node;
wherein the base station transceiver couples to the base station controller and wherein the base station controller couples to the mobile switching station and the packet data serving node.

13. A method for assigning channel elements in a radio access network serving one or more endpoints in one or more given wireless coverage areas, the method comprising:
receiving a request to set up a communication of a particular type with an endpoint in a given wireless coverage area, wherein the request includes an indication of the particular type;
determining a proportion of the channel elements presently assigned to the indicated communication type in response to receiving the request;

generating a first signaling message indicating the request to set up the communication with the endpoint in response to receiving the request, wherein the first signaling message includes an indication of the type indicated in the request;

transmitting the first signaling message to the endpoint in response to generating the first signaling message;

receiving a second signaling message from the endpoint indicating the availability of the endpoint;

generating a third signaling message indicating the identity of the channel element for the given wireless coverage area being assigned to the communication if the proportion does not exceed a predetermined threshold for communications of the type indicated in the request, wherein the third signaling message does not include an indication of the type of the communication being assigned the channel element;

correlating the first signaling message with the third signaling message to determine the type of the communication being assigned the channel element;

recording in data storage the identity of the assigned channel element and an indication of the type of the communication being assigned the channel element; and transmitting the third signaling message to the endpoint.

14. A base transceiver station comprising:

an antenna structure for communicating with endpoints via an air-interface;

a base station controller interface for communicating with a base station controller;

a processor, data storage; and program instructions stored in the data storage and executable by the processor to carry out functions including:

receiving a request to set up a communication of a particular type with an endpoint in a given wireless coverage area, wherein the request includes an indication of the particular type;

determining a proportion of the channel elements for the given wireless coverage area that are presently assigned to communications of the type indicated in the request;

assigning one of the channel elements for the given wireless coverage area to the communication if the proportion does not exceed a predetermined threshold for communications of the type indicated in the request; and storing an indication of the type of the communication being assigned one of the channel elements for the given wireless coverage area.

15. The BTS of claim 14, wherein the data storage contains signaling message data, channel element data, and communication type threshold data.

16. The BTS of claim 14, further comprising program instructions stored in the data storage and executable by the processor to carry out functions including:

transmitting signaling messages, via the antenna structure, to the endpoints;

receiving signaling messages, via the antenna structure, from the endpoints;

transmitting signaling messages, via the base station controller interface, to the base station controller; and receiving signaling messages, via the base station controller interface, from the base station controller.

17. The BTS of claim 14, wherein the processor executes the program instructions for carrying out the function of assigning one of the channel elements for the given wireless coverage area to the communication in response to receiving a signaling message from the endpoint indicating the availability of the endpoint.

18. The BTS of claim 14, further comprising program instructions stored in the data storage and executable by the processor to carry out carry out functions including:

determining information relating to a received signaling message; and storing the information in data storage.

19. The BTS of claim 18, wherein the information stored in data storage includes the received signaling message.

20. The BTS of claim 14, further comprising program instructions stored in the data storage and executable by the processor to carry out a function of correlating a first received signaling message with a second received signaling message, wherein the first received signaling message includes an indication of the type of the communication requiring a channel element and the second received signaling message does not include an indication of the type of the communication requiring a channel element.

* * * * *

UNITED STATES PATENT AND TRADEMARK OFFICE
CERTIFICATE OF CORRECTION

| | | |
|---|---|---|
| PATENT NO. | : 7,684,808 B1 | Page 1 of 1 |
| APPLICATION NO. | : 11/370692 | |
| DATED | : March 23, 2010 | |
| INVENTOR(S) | : Woleben et al. | |

It is certified that error appears in the above-identified patent and that said Letters Patent is hereby corrected as shown below:

Column 20, Line 28, "carry out carry out" should read --carry out--

Signed and Sealed this
Fourth Day of January, 2011

David J. Kappos
*Director of the United States Patent and Trademark Office*